United States Patent [19]
Cromer et al.

[11] Patent Number: 6,161,178
[45] Date of Patent: Dec. 12, 2000

[54] DATA PROCESSING SYSTEM AND METHOD FOR SPECIFICATION OF ONE OF A PLURALITY OF PASSWORD REQUIREMENTS FOR EACH BOOT DEVICE

[75] Inventors: Daryl Carvis Cromer, Cary; Randall S. Springfield, Chapel Hill; Joseph W. Freeman, Raleigh, all of N.C.

[73] Assignee: International Business Machine Corporation, Armonk, N.Y.

[21] Appl. No.: 09/206,686

[22] Filed: Dec. 7, 1998

[51] Int. Cl.[7] ............................. G06F 9/445; G06F 12/14
[52] U.S. Cl. ................................. 713/2; 713/202
[58] Field of Search ................. 713/2, 183, 202

[56] References Cited

U.S. PATENT DOCUMENTS

| | | |
|---|---|---|
| 4,942,606 | 7/1990 | Kaiser et al. . |
| 5,241,594 | 8/1993 | Kung . |
| 5,265,163 | 11/1993 | Golding et al. . |
| 5,268,960 | 12/1993 | Hung et al. . |
| 5,434,562 | 7/1995 | Reardon . |
| 5,513,263 | 4/1996 | White et al. . |
| 5,708,777 | 1/1998 | Sloan et al. . |
| 5,963,142 | 10/1999 | Zinsky et al. ............... 340/825.34 |

*Primary Examiner*—Thomas M. Heckler
*Attorney, Agent, or Firm*—Bernard D. Bogdon; Andrew Dillon

[57] ABSTRACT

A data processing system and method are disclosed for efficiently maintaining security during a booting of the system. The system includes a plurality of boot devices. One of a plurality of password requirements are specified separately for each of the plurality of boot devices. In response to an attempt to boot the system utilizing one of the plurality of boot devices, a determination is made regarding whether a first of the plurality of password requirements is specified for the one of the plurality of boot devices. In response to a determination that the first of the plurality of password requirements is specified for the one of said plurality of boot devices, a correct entry of a password is required prior to permitting the system to boot utilizing the one of the plurality of boot devices.

21 Claims, 4 Drawing Sheets

DATA PROCESSING SYSTEM AND METHOD FOR SPECIFICATION OF ONE OF A PLURALITY OF PASSWORD REQUIREMENTS FOR EACH BOOT DEVICE

BACKGROUND OF THE INVENTION

1. Field of the Invention

The present invention relates in general to data processing systems and, in particular, to a data processing system and method for efficiently maintaining security during a booting of the system. Still more particularly, the present invention relates to a data processing system and method for specifying one of a plurality of password requirements separately for each boot device included within the system.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

A common function provided for in currently available computer systems is a scheme whereby a user may set a password that must be entered prior to the system completing its boot process. The requirement of a correct entry of a password prohibits unauthorized users from accessing the system. These schemes prevent all further boot activities until the password is correctly entered.

Those systems permit the specification of a single password requirement for all of the devices. The password requirement defines whether any password is required in order to boot utilizing any of the boot devices. However, the same password requirement applies to all of the devices. If a password requirement is specified such that correct entry of a password is necessary, the password must be correctly entered whether the user is booting utilizing the floppy drive, CD ROM drive, the network, or the hard drive.

An additional password may be specified by the operating system which requires correct entry of the password prior to utilizing the operating system. For these systems, a user is required to correctly enter two passwords each time the system boots.

Another password scheme is known for permitting a networked system to remotely cause a client to boot utilizing the network without entering a password, or to boot locally if a password was correctly entered. This scheme is called "dual mode".

Therefore a need exists for a data processing system and method for efficiently maintaining security during a booting of the system by specifying a separate password requirement for each possible bootable device.

SUMMARY OF THE INVENTION

A data processing system and method are disclosed for efficiently maintaining security during a booting of the system. The system includes a plurality of boot devices. One of a plurality of password requirements are specified separately for each of the plurality of boot devices. In response to an attempt to boot the system utilizing one of the plurality of boot devices, a determination is made regarding whether a first of the plurality of password requirements is specified for the one of the plurality of boot devices. In response to a determination that the first of the plurality of password requirements is specified for the one of said plurality of boot devices, a correct entry of a password is required prior to permitting the system to boot utilizing the one of the plurality of boot devices.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

The present invention is a method and system for efficiently maintaining security during a booting of the system. The system includes a plurality of boot devices. For example, the boot devices may include a floppy drive, a hard drive, a CD ROM drive, and/or a network.

A password requirement is specified separately for each boot device within the system. Different password requirements may be specified for the different devices within the system. A password requirement may be a requirement that a previously specified password be entered, or that no password need be entered. The password requirement may also specify a dual mode password scheme. For example, a user may specify that for boots utilizing the floppy drive or the CD ROM drive, a password is required, while for boots utilizing the hard drive, no password is required, and for boots utilizing the network, a dual mode scheme is implemented.

Thereafter, when the system begins executing a boot process, a determination is made regarding what password requirement has been specified for each boot device included within the system. The system then selects the first device to utilize to attempt to boot. If a password requirement has been specified requiring the correct entry of a password, the system will prompt the user for a password. If the user enters the correct password, the system will complete the boot process utilizing the first device. However, if the user does not correctly enter the password, the system will not complete its boot. In this event, the system may be configured to attempt a boot from a second device. If the first device has a password requirement specified which does not require a correct entry of a password, the system will complete the boot process utilizing the first device.

Figure 1:
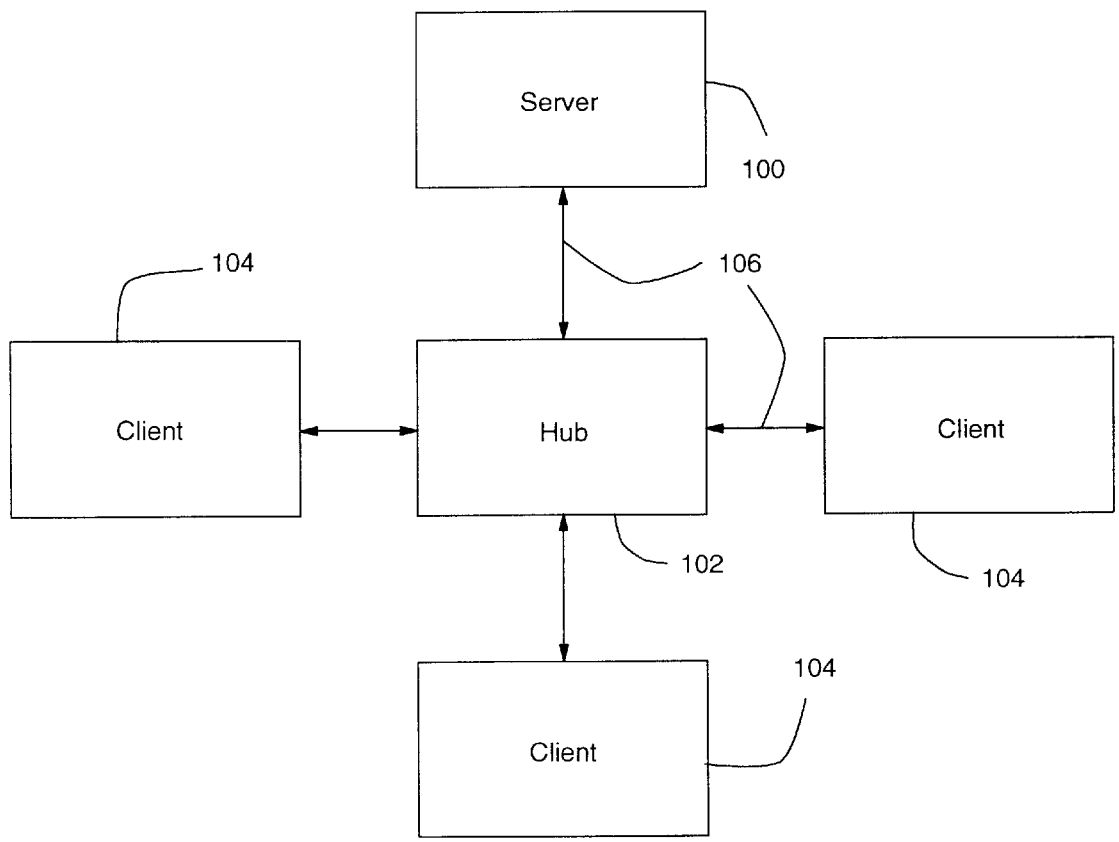
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

The term "network" includes any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
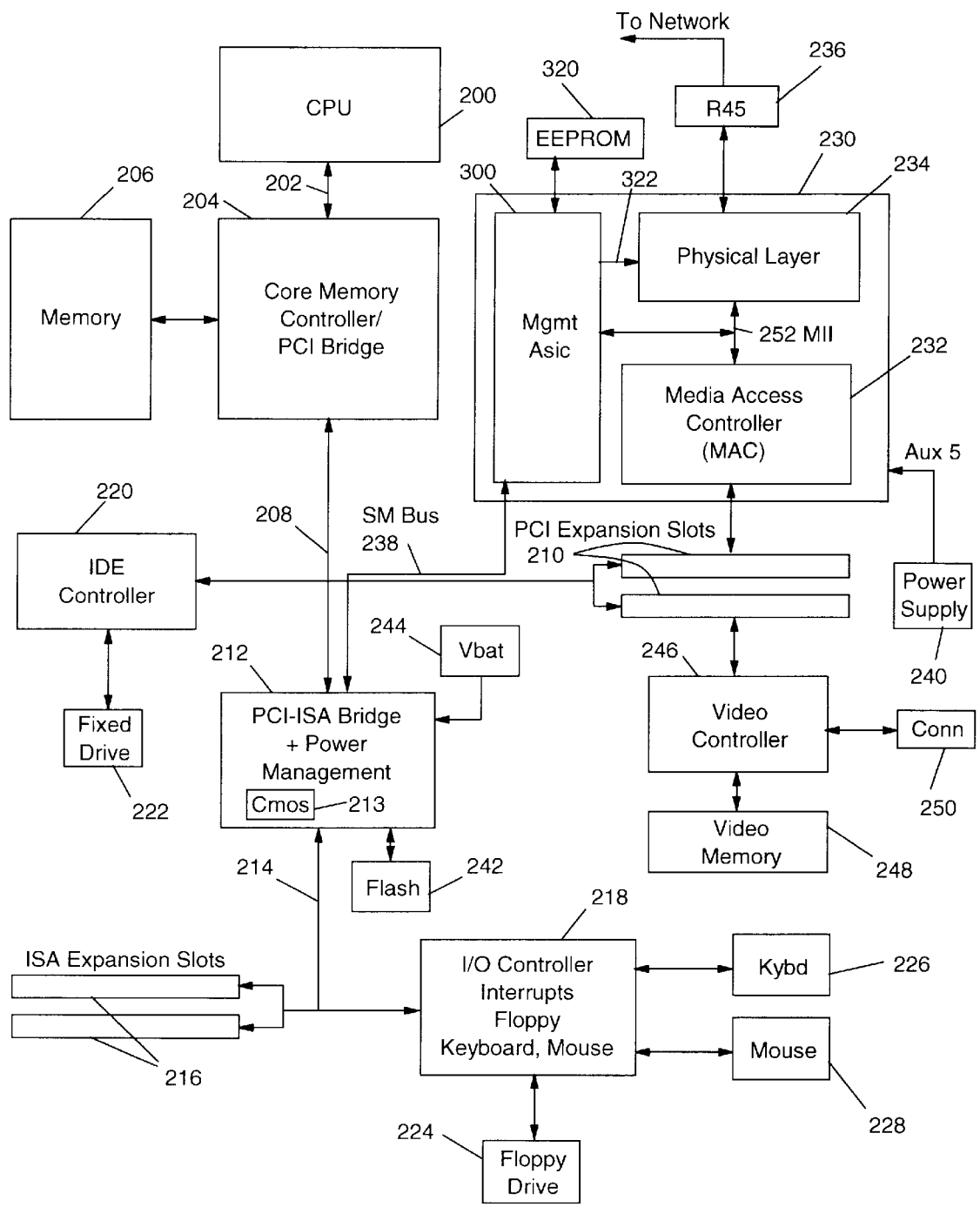
FIG. 2 depicts a more detailed pictorial representation of a computer system of FIG. 1 in accordance with the method and system of the present invention.

FIG. 2 illustrates a more detailed pictorial representation of a computer system of FIG. 1 in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes POST and BIOS that are used to interface between the I/O devices and operating system. PCI-ISA bridge controller 212 also includes storage 213, which is preferably implemented utilizing CMOS storage, that holds the initialization settings, also called BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time auxiliary power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or logic module, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time.

Figure 3:
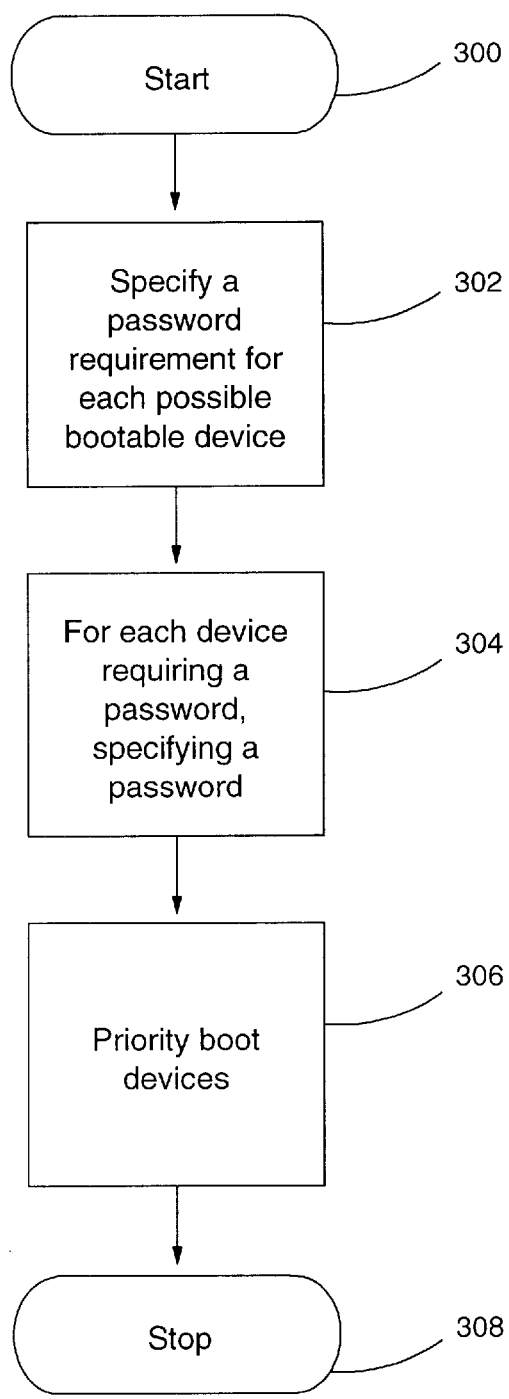
FIG. 3 illustrates a high level flow chart which depicts establishing a password requirement for each boot device within the computer system of FIG. 2 in accordance with the method and tem of the present invention.

FIG. 3 illustrates a high level flow chart which depicts establishing a password requirement for each boot device within the computer system of FIG. 2 in accordance with the method and system of the present invention. The process starts as depicted by block 300 and thereafter passes to block 302 which illustrates the specification of one of a plurality of password requirements for each possible boot device. In this manner, each device is associated with one of the possible password requirements. For example, a floppy drive and CD ROM drive may require a correct entry of a password prior to the system booting from one of these devices, while the hard disk does not require any entry of a password. Next, block 304 depicts specifying a password for each device which requires a password. Thereafter, block 306 illustrates establishing a boot priority hierarchy. The boot hierarchy priorities the possible boot devices, and defines the order in which POST will utilize these devices to attempt to boot the system. For example, the highest priority boot device may be the hard drive. POST would then attempt to boot the system first utilizing the hard drive. If the hard drive was not capable of booting the system, POST would then attempt to boot the system utilizing the next highest priority boot device included within the hierarchy. The process then terminates as illustrated by block 308.

Figure 4:
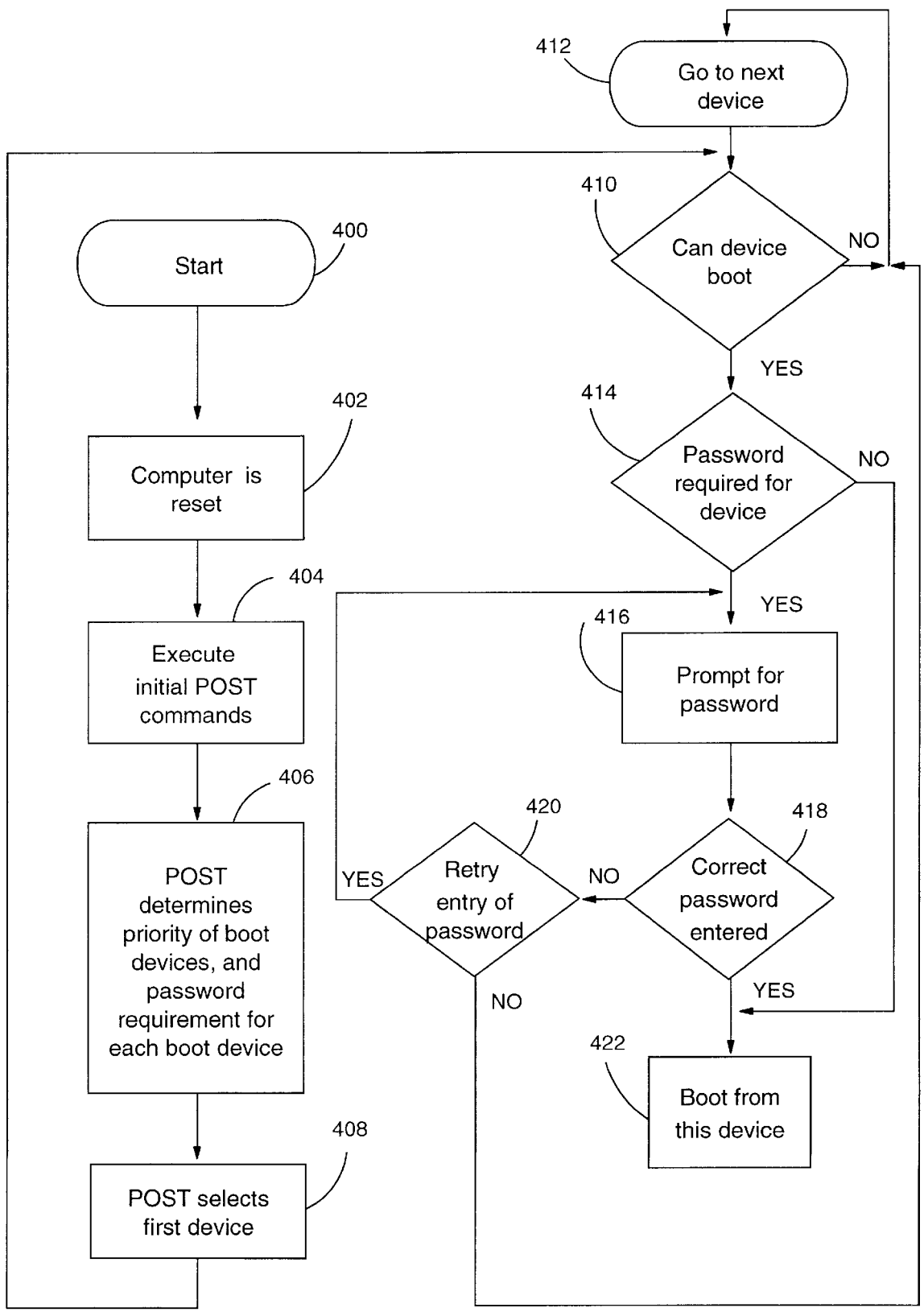
FIG. 4 depicts a high level flow chart which illustrates a boot process utilizing one of a plurality of boot devices, each device having its own associated password requirement, in accordance with the method and system of the present invention.

FIG. 4 depicts a high level flow chart which illustrates a boot process utilizing one of a plurality of boot devices, each device having its own associated password requirement, in accordance with the method and system of the present invention. The process starts as depicted by block 400 and thereafter passes to block 402 which illustrates the computer system being reset. Next, block 404 depicts the execution of initial POST commands. Thereafter, block 406 illustrates a determination by POST of a priority of boot devices. A priority of boot devices is a hierarchical arrangement of the boot devices. POST utilizes the prioritized list of boot devices to determine which device to attempt to boot from first. POST also determines what password requirement has been associated with each boot device.

The process then passes to block 408 which depicts a selection by POST of highest priority boot device. Next, block 410 illustrates a determination of whether or not the highest priority boot device is capable of booting the system. If a determination is made that the highest priority boot device is not capable of booting the system, the process passes to block 412 which depicts POST going to the next highest priority boot device. The process then passes back to block 410.

Referring again to block 410, if a determination is made that the highest priority boot device is capable of booting the system, the process passes to block 414 which illustrates a determination of whether or not a correct entry of a password is required for this particular device. If a determination is made that no password is required for this device, the process passes to block 422 which depicts POST booting utilizing this device. Referring again to block 414, If a determination is made that a password is required, the process passes to block 416 which depicts the prompting for entry of a password.

Next, block 418 illustrates a determination of whether or not the correct password was entered. If a determination is made that the correct password was not entered, the process passes to block 420 which depicts a determination of whether or not another attempt at entering the password is permitted. If a determination is made that the user may not reattempt to correctly enter the password, the process passes to block 412. Referring again to block 420, if a determination is made that the user may reattempt to correctly enter the password, the process passes back to block 416.

Referring again to block 418, if a determination is made that the correct password was entered, the process passes to block 422 which illustrates POST booting utilizing this device.

While a preferred embodiment has been particularly shown and described, it will be understood by those skilled in the art that various changes in form and detail may be made therein without departing from the spirit and scope of the present invention.

What is claimed is:

1. A method in a data processing system including a plurality of boot devices for efficiently maintaining security during a booting of said system, said method comprising the steps of:

specifying one of a plurality of password requirements for each of said plurality of boot devices;

in response to an attempt to boot said system utilizing one of said plurality of boot devices, determining if a first of said plurality of password requirements is specified for said one of said plurality of boot devices; and in response to a determination that said first of said plurality of password requirements is specified for said one of said plurality of boot devices, requiring a correct entry of a password prior to permitting said boot utilizing said one of said plurality of boot devices.

2. The method according to claim 1, further comprising the step of in response to a determination that a second of said plurality of password requirements is specified for said one of said plurality of boot devices, permitting said boot utilizing said one of said plurality of boot devices, wherein a correct entry of a password is not required prior to booting said system utilizing said one of said plurality of boot devices.

3. The method according to claim 2, further comprising the steps of:

initiating said boot of said system utilizing said one of said plurality of boot devices;

in response to said first one of said plurality of password requirements being specified for said one of said plurality of boot devices, prompting for an entry of a password associated with said one of said plurality of boot devices;

in response to a correct entry of said password, permitting said system to complete said boot utilizing said one of said plurality of boot devices; and in response to an incorrect entry of said password, prohibiting said system from completing said boot utilizing said one of said plurality of boot devices.

4. The method according to claim 3, further comprising the step of specifying a password for each of said plurality of boot devices for which said first one of said plurality of password requirements is specified.

5. The method according to claim 4, further comprising the step of specifying a boot order, said boot order being a hierarchical order of said plurality of boot devices for selecting one of said plurality of boot devices to utilize to boot said system.

6. The method according to claim 5, wherein the step of initiating said boot of said system utilizing one of said plurality of boot devices further comprises the step of initiating said boot of said system utilizing one of said plurality of boot devices being a highest priority within said hierarchical order.

7. The method according to claim 6, further comprising the steps of:

determining whether said one of said plurality of boot devices being said highest priority is capable of booting said system;

in response to a determination that said one of said plurality of boot devices being said highest priority is capable of booting said system, determining whether said first of said plurality of password requirements has been specified for said one of said plurality of boot devices being said highest priority;

in response to a determination that said first of said plurality of password requirements has been specified for said one of said plurality of boot devices being said highest priority, prompting for an entry of a password associated with said one of said plurality of boot devices being a highest priority;

in response to a correct entry of said password, permitting said system to boot utilizing said one of said plurality of boot devices being a highest priority; and in response to a determination that said one of said plurality of boot devices being said highest priority is not capable of booting said system, determining whether a next one of said plurality of boot devices being said a next highest priority is capable of booting said system.

8. The method according to claim 7, further comprising the step of specifying a password requirement requiring correct entry of a password for one of said plurality of boot devices.

9. The method according to claim 8, further comprising the step of specifying no password requirement for one of said plurality of boot devices.

10. The method according to claim 9, further comprising the step of specifying a dual mode password requirement for one of said plurality of boot devices.

11. A data processing system including a plurality of boot devices for efficiently maintaining security during a booting of said system, comprising:

said system executing code for specifying one of a plurality of password requirements for each of said plurality of boot devices;

said system executing code responsive to an attempt to boot said system utilizing one of said plurality of boot devices, for determining if a first of said plurality of password requirements is specified for said one of said plurality of boot devices; and said system executing code responsive to a determination that said first of said plurality of password requirements is specified for said one of said plurality of boot devices, for requiring a correct entry of a password prior to permitting said boot utilizing said one of said plurality of boot devices.

12. The system according to claim 11, further comprising said system executing code responsive to a determination that a second of said plurality of password requirements is specified for said one of said plurality of boot devices, for permitting said boot utilizing said one of said plurality of boot devices, wherein a correct entry of a password is not required prior to booting said system utilizing said one of said plurality of boot devices.

13. The system according to claim 12, further comprising:

said system executing code for initiating said boot of said system utilizing said one of said plurality of boot devices;

said system executing code responsive to said first one of said plurality of password requirements being specified for said one of said plurality of boot devices, for prompting for an entry of a password associated with said one of said plurality of boot devices;

said system executing code responsive to a correct entry of said password, for permitting said system to complete said boot utilizing said one of said plurality of boot devices; and said system executing code responsive to an incorrect entry of said password, for prohibiting said system from completing said boot utilizing said one of said plurality of boot devices.

14. The system according to claim 13, further comprising said system executing code for specifying a password for each of said plurality of boot devices for which said first one of said plurality of password requirements is specified.

15. The system according to claim 14, further comprising said system executing code for specifying a boot order, said boot order being a hierarchical order of said plurality of boot devices for selecting one of said plurality of boot devices to utilize to boot said system.

16. The system according to claim 15, wherein said system executing code for initiating said boot of said system utilizing one of said plurality of boot devices further comprises said system executing code for initiating said boot of said system utilizing one of said plurality of boot devices being a highest priority within said hierarchical order.

17. The system according to claim 16, further comprising:

said system executing code for determining whether said one of said plurality of boot devices being said highest priority is capable of booting said system;

said system executing code responsive to a determination that said one of said plurality of boot devices being said highest priority is capable of booting said system, for determining whether said first of said plurality of password requirements has been specified for said one of said plurality of boot devices being said highest priority;

said system executing code responsive to a determination that said first of said plurality of password requirements has been specified for said one of said plurality of boot devices being said highest priority, for prompting for an entry of a password associated with said one of said plurality of boot devices being a highest priority;

said system executing code responsive to a correct entry of said password, for permitting said system to boot utilizing said one of said plurality of boot devices being a highest priority; and said system executing code responsive to a determination that said one of said plurality of boot devices being said highest priority is not capable of booting said system, for determining whether a next one of said plurality of boot devices being said a next highest priority is capable of booting said system.

18. The system according to claim 17, further comprising said system executing code for specifying a password requirement requiring correct entry of a password for one of said plurality of boot devices.

19. The system according to claim 18, further comprising said system executing code for specifying no password requirement for one of said plurality of boot devices.

20. The system according to claim 19, further comprising said system executing code for specifying a dual mode password requirement for one of said plurality of boot devices.

21. A data processing system including a plurality of boot devices, comprising:

said system executing code for specifying a password for each of said plurality of boot devices for which said first one of said plurality of password requirements is specified;

said system executing code for specifying a boot order, said boot order being a hierarchical order of said plurality of boot devices for selecting one of said plurality of boot devices to utilize to boot said system;

wherein said system executing code for initiating said boot of said system utilizing one of said plurality of boot devices further comprises said system executing code for initiating said boot of said system utilizing one of said plurality of boot devices being a highest priority within said hierarchical order;

said system executing code for determining whether said one of said plurality of boot devices being said highest priority is capable of booting said system;

said system executing code responsive to a determination that said one of said plurality of boot devices being said highest priority is capable of booting said system, for determining whether said first of said plurality of password requirements has been specified for said one of said plurality of boot devices being said highest priority;

said system executing code responsive to a determination that said first of said plurality of password requirements has been specified for said one of said plurality of boot devices being said highest priority, for prompting for an entry of a password associated with said one of said plurality of boot devices being a highest priority;

said system executing code responsive to a correct entry of said password, for permitting said system to boot utilizing said one of said plurality of boot devices being a highest priority;

said system executing code responsive to a determination that said one of said plurality of boot devices being said highest priority is not capable of booting said system, for determining whether a next one of said plurality of boot devices being said a next highest priority is capable of booting said system.

* * * * *